United States Patent [19]

Baraszu

[11] Patent Number: 4,838,574
[45] Date of Patent: Jun. 13, 1989

[54] HYBRID SUSPENSION POSITION AND BODY VELOCITY SENSING SYSTEM FOR AUTOMOTIVE SUSPENSION CONTROL SYSTEM

[75] Inventor: Robert C. Baraszu, Dearborn, Mich.

[73] Assignee: Ford Motor Company, Dearborn, Mich.

[21] Appl. No.: 133,098

[22] Filed: Dec. 14, 1987

[51] Int. Cl.⁴ .............................................. B60G 17/00
[52] U.S. Cl. .................................. 280/707; 364/424.01
[58] Field of Search ........................ 280/707, DIG. 1; 267/126, 64.16; 364/424

[56] References Cited

U.S. PATENT DOCUMENTS

| | | | |
|---|---|---|---|
| 3,807,678 | 4/1974 | Karnopp et al. | 267/126 |
| 4,065,154 | 12/1977 | Glaze | 280/707 |
| 4,368,900 | 1/1983 | Beusse | 280/707 |
| 4,468,050 | 8/1984 | Woods et al. | 280/707 |
| 4,579,366 | 4/1986 | Doi et al. | 280/707 |
| 4,625,993 | 12/1986 | Williams et al. | 280/707 |
| 4,648,622 | 3/1987 | Wada et al. | 280/707 |
| 4,693,485 | 9/1987 | Kamei et al. | 280/707 |
| 4,696,489 | 9/1987 | Fujishiro et al. | 280/707 |
| 4,726,453 | 2/1988 | Obstfelder et al. | 280/707 |

Primary Examiner—Charles A. Marmor
Assistant Examiner—Ross Weaver
Attorney, Agent, or Firm—Jerome R. Drouillard; Roger L. May

[57] ABSTRACT

A system for generating signal representative of the vertical velocity of the body of an automotive vehicle including position sensor for sensing the relative vertical position of a road wheel and tire assembly with respect to the body and for producing a suspension position signal corresponding to the road wheel and tire position and a processor operatively associated with the position sensor for integrating the suspension position signal so as to produce a body velocity signal which is representative of the vertical velocity of the body. A control system for utilizing the body vertical velocity signal in a variety of algorithms for adjusting the adjustable damping feature of an automotive suspension unit.

23 Claims, 8 Drawing Sheets

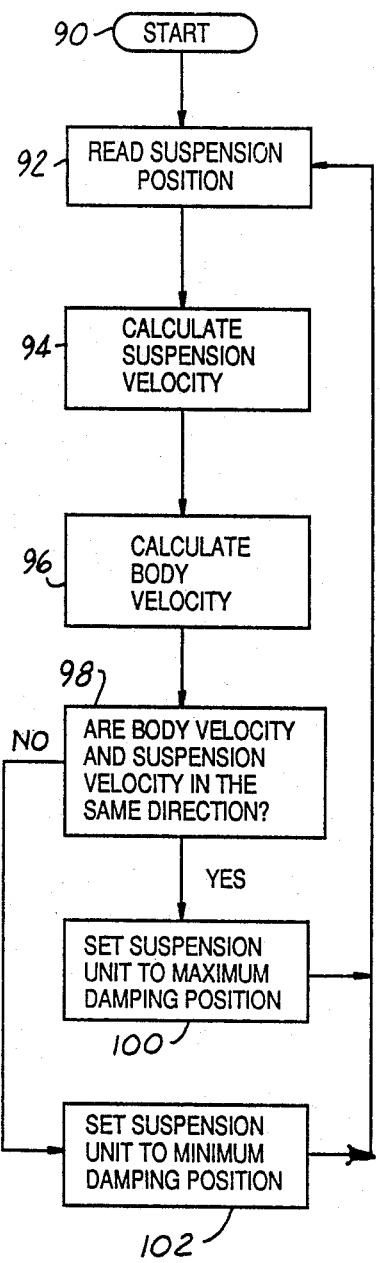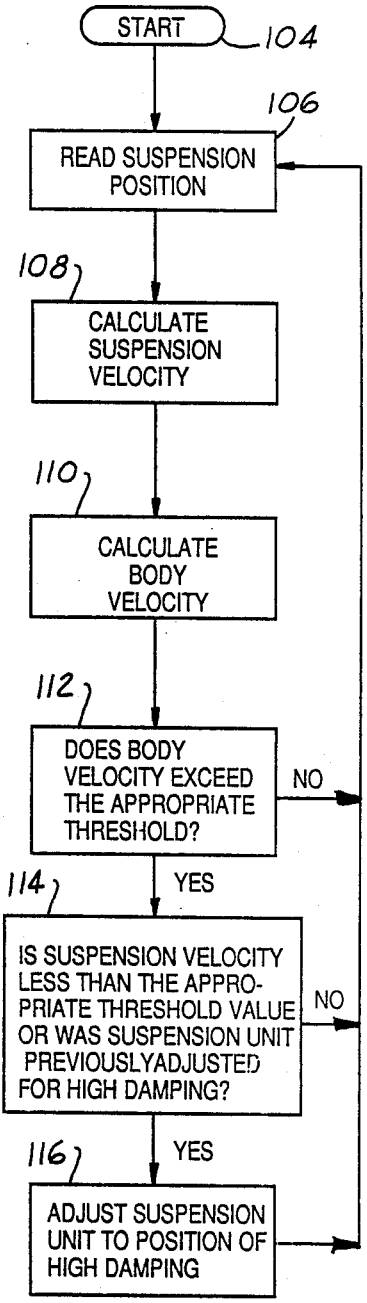
FIG. 10
FIG. 11

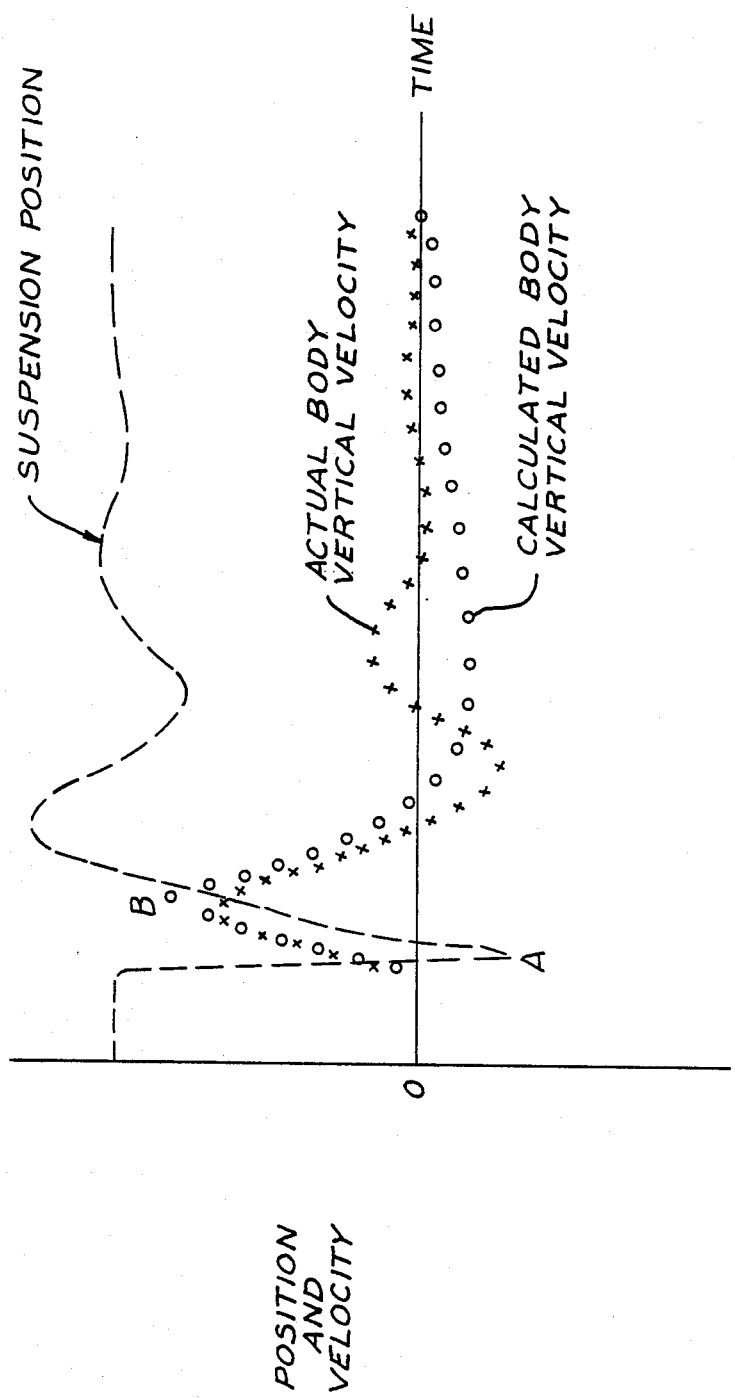

HYBRID SUSPENSION POSITION AND BODY VELOCITY SENSING SYSTEM FOR AUTOMOTIVE SUSPENSION CONTROL SYSTEM

BACKGROUND OF THE INVENTION

1. Field of the Invention

This invention relates to a hybrid suspension position and body velocity sensor as well as to an associated automotive suspension control system.

2. Description of Related Art

Automotive suspensions employing adjustable suspension units typically utilize one or more sensors for detecting the vertical position of a controlled road wheel and tire assembly with respect to either another part of the suspension itself or another part of the chassis or body of the vehicle. In the case of vehicles using load leveling or air or hydropneumatic suspension systems, it is necessary to know the ride height of the vehicle in order to determine whether correction of the ride height is required. If the suspension position sensor indicates that the ride height is less than a prescribed low limit, the adjustable suspension unit will be given the command to increase the ride height. Conversely, in the event that sensed ride height exceeds a prescribed high limit, the adjustable suspension unit will be given the command to lower, or decrease, the ride height.

Vehicular height sensors are useful not only with ride height adjusting systems but also as transducers for use with adjustable suspension dampers. It is known for example to control suspension dampers based upon data concerning the speed of the suspension movement in jounce or rebound.

Certain other suspension control algorithms utilize information concerning the vertical velocity of the vehicle's body. U.S. Pat. Nos. 3,807,678 and 4,696,489 disclose control systems in which accelerometers are employed for the purpose of sensing the vertical velocity of a vehicle body. A second sensor is employed with each of the systems of the '678 and '489 patents for determining the vertical velocity of the suspension and wheel and tire assembly with respect to the body of the vehicle. These two vertical velocities are compared and then as a result of such comparison a damping setting is chosen for an adjustable suspension unit. It should be noted that in each of the systems of the '678 and '489 patents a separate accelerometer is required to provide a signal which may be integrated to provide a signal representative of body vertical velocity. The body vertical velocity signal is then used, as previously described, in a control algorithm for operating the adjustable suspension units.

U.S. Pat. No. 4,625,993 illustrates another type of control system in which an accelerometer is used for the purpose of sensing body vertical velocity.

U.S. Pat. No. 4,065,154 describes a control system in which damping of an adjustable suspension unit is prescribed as a function of a pressure signal from the damper and the velocity of the wheel with respect to the body.

It is an object of the present invention to provide a hybrid suspension position and body velocity sensing system for an automotive suspension control system requiring only a single sensing element for not only suspension position but also body vertical velocity information. It is an advantage of the present invention that a sensing system according to this invention obviates the need for accelerometer for the purpose of generating signals representative of body vertical velocity.

It is an advantage of the present invention that a sensing system according to this invention may be used not only with adjustable suspension units capable of controlling vehicle ride height and suspension damping, but also with adjustable suspension units in which only suspension damping is variable.

Other objects, features and advantages of the present invention will become apparent to the reader of this document.

SUMMARY OF THE INVENTION

According to the present invention, a system for generating a signal which is representative of the vertical velocity of the body of an automotive vehicle includes position sensor means for sensing the relative vertical position of a road wheel and tire assembly with respect to the body and for producing a suspension position signal corresponding to the road wheel and tire position. The system further includes processor means operatively associated with the position sensor means for integrating the position signal so as to produce a body velocity signal which is representative of the vertical velocity of the body. The position sensor may comprise a linear variable differential transformer or a Hall Effect device or yet other types of suitable sensing devices. The processor means may comprise a digital filter and preferably comprises a digital band pass filter.

The processor means may further comprise means for differentiating the suspension position signal so as to obtain a suspension velocity signal and means for comparing the body velocity signal with the derived suspension velocity signal so that a control signal may be produced which has a value which is dependent upon the result of the comparison. In practice, an adjustment means for adjusting an adjustable suspension unit will respond to the control signal.

In one control strategy according to the present invention, an adjustable suspension unit will be adjusted to a position of maximum damping in the event that a comparison of body velocity and suspension velocity indicates that the motion of the body and the relative motion of the body with respect to the road wheel are in the same direction. To avoid undue corrections of the suspension unit, the control system may include a body velocity threshold such that the control signal requiring adjustment of the suspension unit will be produced only in the event that the magnitude of the body velocity exceeds such threshold. In order to provide an acceptable ride characteristic using a system in which an adjustable suspension unit is adjusted to a position of maximum damping in the event that the comparison of the body velocity and suspension velocity indicates that the motion of the body and relative motion of the body with respect to the road wheel are in the same direction, the adjustable suspension unit may be adjusted to a position of minimum damping whenever the motion of the body and the relative motion of the body with respect to the road wheel are in opposite directions.

A suspension position and body velocity sensing system according to the present invention is useful for practicing a number of suspension control algorithms in addition to those previously described. Accordingly, information from a system according to this invention is useful for adjusting the magnitude of the damping produced by the suspension unit so that the damping is proportional to the magnitude of the relative motion of the body with respect to a controlled road wheel. On the other hand, damping may be controlled so that the damping produced by the suspension unit is proportional to the magnitude of the body velocity. A system according to the present invention is useful in yet another control algorithm in which the adjustable suspension unit is adjusted to produce a high magnitude of damping force whenever body vertical velocity exceeds a first threshold value and (i) either the suspension velocity is less than a second threshold value, or (ii) the suspension unit was previously adjusted to produce a high magnitude of damping force. In yet another control algorithm, the adjustable suspension unit may be adjusted to the position of maximum damping in the event that the body velocity exceeds a threshold value.

According to this invention, an adjustable suspension unit and suspension control system for a motor vehicle includes the previously described position sensor means for sensing the relative vertical position of a road wheel and tire assembly and processor means operatively associated with the sensor for generating signals representative of vertical body velocity and suspension velocity with respect to the body. The adjustable suspension unit may include adjustment means operatively connected with the processor means and responsive to control signals therefrom for adjusting the adjustable suspension unit. The adjustment means may comprise a valve housed within a piston attached to a piston rod within the suspension unit and electromagnetic means for receiving control signals from the processor and for operating the valve means. The valve may comprise a generally tubular sleeve having a coil wound about a portion of the sleeve. It is intended that the coil will cooperate with a permanent magnet positioned in the suspension unit's piston such that an electromagnetic valve control force is produced when control signals from the processor are applied to the coil. As before, the suspension position sensor may comprise a linear variable differential transformer or Hall Effect device or other suitable device. This system will function by comparing a body velocity signal with the suspension velocity signal obtained by differentiating the suspension position signal and by producing a control signal with a value which is dependent on the result of the comparison.

BRIEF DESCRIPTION OF THE DRAWINGS

FIGS. 10, 11 and 12 illustrate various suspension control algorithms which may be practiced with the system according to the present invention.

FIG. 13 illustrates the output data received from a system according to the present invention in terms of suspension position and calculated body velocity. This figure also includes a comparison of calculated body vertical velocity with actual body vertical velocity.

DETAILED DESCRIPTION OF THE PREFERRED EMBODIMENTS

Figure 1:
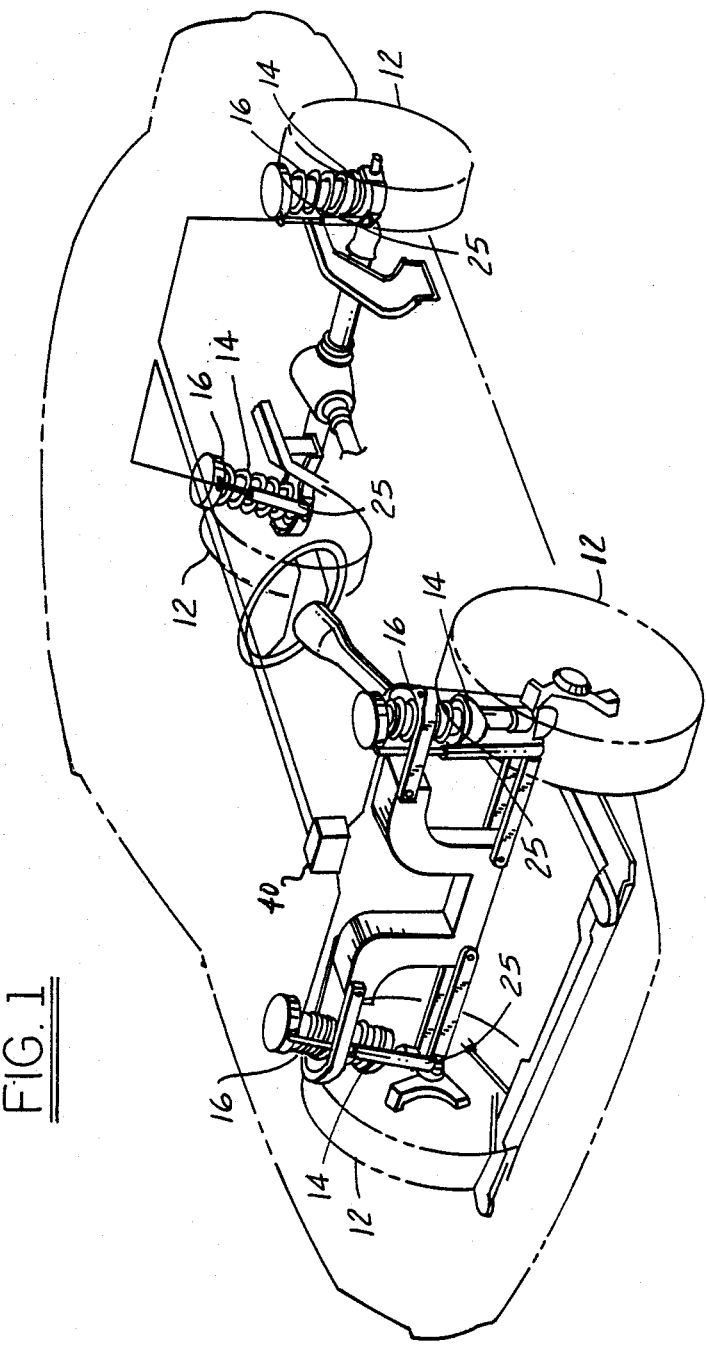
FIG. 1 is a partially schematic representation of a vehicle equipped with a system according to the present invention.

As noted above, the present invention is related to the control of adjustable vehicular suspension units based upon at least the vertical velocity of a vehicle body. Also, as previously noted, the present system dispenses with the troublesome accelerometers and instead utilizes the output of a sensor which would normally be operated for the purpose of disclosing the position of a road wheel with respect to the vehicle body, for the purpose of providing a signal from which vertical body velocity may be derived. It has been determined that body vertical velocity may be closely approximated by integrating the output of a position sensor which sensor detects the relative vertical position of a road wheel and tire assembly with respect to the body. This determination stems from the following considerations.

Vertical body acceleration for each individual road wheel and tire suspension may be modeled according to the following equation:

$$B_A = \int -(K/B_M)*(B_D-W_D) - F_S/B_M \quad (1)$$

where
$B_A$ = Absolute body vertical acceleration
$B_D$ = Absolute body vertical displacement
$W_D$ = Absolute wheel vertical displacement
K = Spring rate
$B_M$ = Equivalent mass of vehicle body (one corner)
$F_S$ = Damping force developed by shock absorber
$(B_D - W_D)$ = Measured shock absorber displacement Absolute body velocity and vertical direction is integral of absolute body acceleration:

$$B_V = \int B_A$$

It has been determined that for many vehicles the natural frequency of the body is in the range of 1 to 2 Hz while the natural frequency of the road wheel and tire assembly and associated suspension is 10-13 Hz. It has further been determined that the 2 Hz component of body acceleration and, therefore, the body velocity, is due primarily to spring force. The force of the suspension springs contributes approximately 75% of the 2 Hz component of body acceleration. As a result, by measuring road wheel displacement and neglecting the small contribution of shock absorber force $(F_S/B_M)$, absolute body velocity is approximated by the following equation:

$$B_V \approx [-(K/B_M)*(B_D-W_D)]$$

Reviewing the last equation set forth above, one notices that the value of one of the two terms within the parenthesis is fixed, i.e., $K/B_M$, whereas the value of the other two terms within the parenthesis, i.e., $B_D-W_D$, is simply equal to the sensed reading from a suspension position sensor which senses the relative vertical position of a road wheel and tire assembly with respect to the body of the vehicle. Accordingly, by integrating the suspension position sensor output and multiplying the result by constant, a good approximation can be obtained of the body's vertical velocity. The integration required herein may easily be performed by means of a digital filter contained within a microprocessor. Such digital filtering requires the following considerations. First, the signals of the suspension position sensor as well as the peripheral electronics connected with the sensor in the microprocessor typically exhibit DC offsets. These offsets must be filtered so as not to effect the vertical body velocity calculation. As a result, a pseudo-integrator or band pass filter is needed to attenuate the DC component of the suspension position sensor's signal. This band pass filter will further serve to integrate (low pass filter) frequencies above approximately 1 Hz. A gain vs. frequency plot is shown for such a filter in FIG. 3. Frequencies at points a and b are chosen so as to result in an attenuation of about 3 decibels. In practice, points a and b are selected so that point a is slightly above 0.2 Hz, whereas point b is below above 0.2 Hz. Thus, the filter will cause DC offsets to be removed from the signal emanating from the position sensors 25 and 10 of FIGS. 2 and 7 respectively while at the same time integrating signals at frequencies above 1 Hz.

The following format has been found to be useful for implementing the previously described digital filter.

$$Y(K) = \alpha(U(K) - U(K-2)) + \beta Y(K-1) - \gamma Y(K-2)$$

where:
Y(K) is estimated body velocity at time t=K
Y(K−1) is estimated body velocity at time t=K−1
Y(K−2) is estimated body velocity at time t=K−2
U(K) is suspension unit displacement at time t=K
U(K−1) is suspension unit displacement at time t=K−1
U(K−2) is suspension unit displacement at time t=K−2

In the equation above, $\alpha$, $\beta$, and $\gamma$ are constants that set the filter characteristics:

$$\alpha = \frac{2aT}{4 + 2aT + 2bT + abT^2} = \frac{2aT}{(2 + aT)(2 + bT)}$$

$$\beta = \frac{2(4 - abT^2)}{(2 + aT)(2 + bT)}$$

$$\gamma = \frac{(2 - aT)(2 - bT)}{(2 + aT)(2 + bT)}$$

Where:
T=Sample period (6 ms)
a=Low pass cutoff frequency in radians
b=High pass cutoff frequency in radians FIG. 1 illustrates a vehicle equipped with a system according to the present invention. In each corner of the vehicle, a road wheel and tire assembly, 12, is subject to vertical motion controllable by suspension spring 16 and adjustable suspension unit 14. Each suspension also includes a suspension position sensor, 25, for sensing the relative vertical position of the road wheel and tire assembly with respect to the body or chassis of the vehicle. The position sensor produces a suspension position signal corresponding to the road wheel and tires' vertical position. Information from the position sensors is fed into control module 40.

Figure 2:
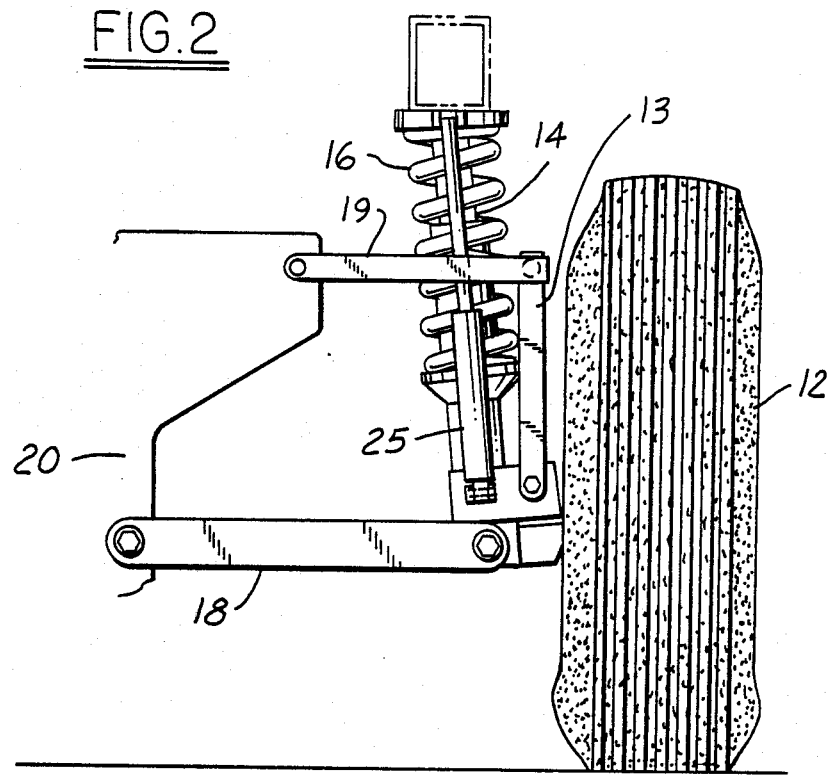
FIG. 2 is a frontal elevation of a front suspension portion of the vehicle shown in FIG. 1.
Figure 3:
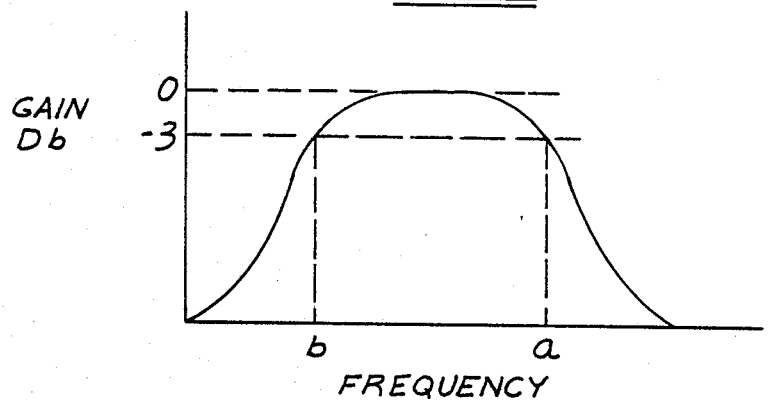
FIG. 3 is a response characteristic plot for a digital filter according to the present invention.
Figure 7:
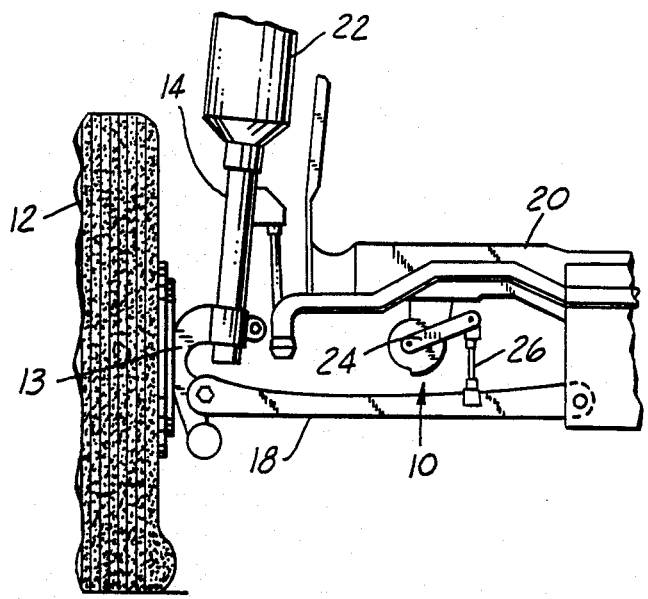
FIG. 7 is a frontal elevation of a vehicular suspension according to the present invention showing a rotary type of height sensor mechanism.

FIGS. 2 and 7 illustrate but two types of suspension systems suitable for use with the present invention. As shown in each of these figures, road wheel and tire assembly 12 is rotatably supported upon wheel carrier 13. In each case, lower control arm 18 is pivotally connected to the wheel carrier at its outboard end, and to the body or chassis of the vehicle, 20, at its inboard end. In FIG. 2, an upper control arm and coil spring 16 complete the suspension geometry. Upper control arm 19 is pivotally attached at its outboard end to the wheel carrier and its inboard end to the chassis 20. The suspension shown in FIG. 2 further includes adjustable suspension unit 14 which may have adjustable damping, or adjustable load carrying capabilities or both. FIG. 2 further illustrates use of position sensor 25. This sensor may comprise a linear variable differential transformer (hereinafter "LVDT"), a Hall Effect device or one of a variety of other devices suitable for use according to the present invention. Regardless of the type of suspension position sensor chosen, the function of the sensor is to disclose the vertical position of the wheel and tire assembly as the wheel and tire moves through in the directions of jounce and rebound.

Figure 5:
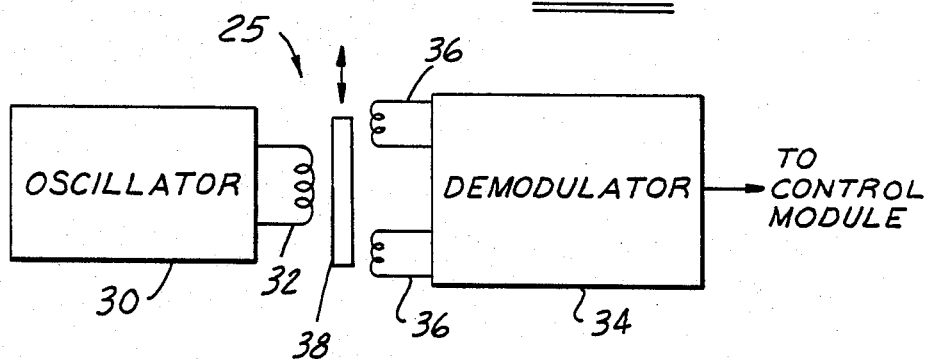
FIG. 5 is a partially schematic representation of a linear variable differential transformer.
Figure 6:
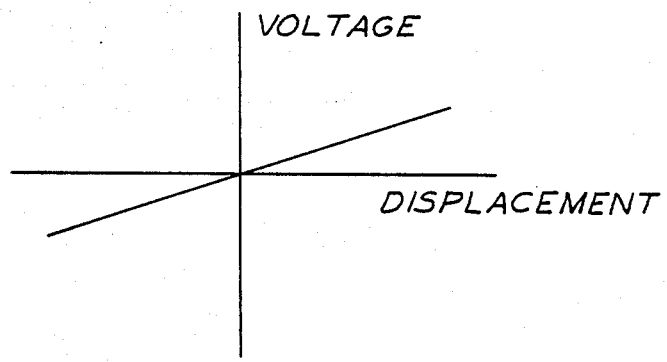
FIG. 6 illustrates the output waveform of the linear variable differential transformer illustrated in FIG. 5.

FIGS. 5 and 6 illustrate the component parts and output characteristics of a typical LVDT. In practice, oscillator 30 drives an alternating current in primary winding 32. Two secondary windings, 36, are connected to a demodulator unit, 34. The coupling between the primary and secondary windings is dependent upon the position of slug 38. This slug, which is comprised of a high permeability material, causes an imbalance in the coupling effect between the primary winding and the two secondary windings such that the difference between the output voltages of the secondary windings 36 is representative of the position of the slug. The direction of displacement of the slug affects the phase of the signal from the two secondary windings, which necessitates that the demodulator be sensitive to phase shifts. A typical output for an LVDT is illustrated in FIG. 6, which shows that the voltage output of the LVDT is proportional to the displacement of slug 38.

Figure 4:
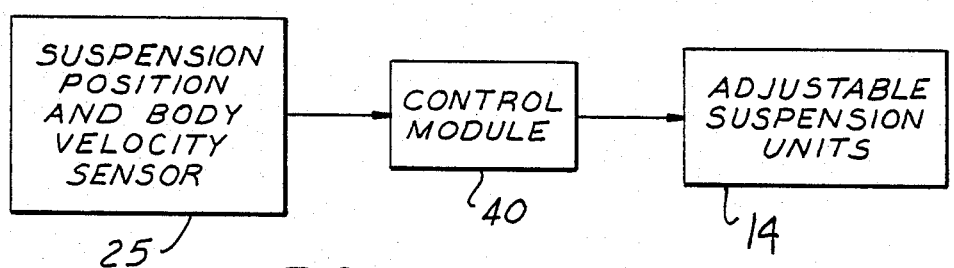
FIG. 4 is a block diagram illustrating several of the component parts of a control system according to the present invention.

Mounting of LVDT 25 in a position as shown in FIG. 2, such that the slug moves into and out of the core area of the LVDT as the suspension moves in jounce and rebound will thus produce a signal which is proportional to the position of the sensor, and hence, the suspension and wheel and tire assembly. As shown in FIG. 4, the output of each sensor 25 is fed into control module 40.

It has been determined that an Intel model 8096 microprocessor and a Trans-Tek series 240 LVDT are useful for practicing the present invention. Before passing into the microprocessor, the raw sensor outputs will be passed through a signal conditioner comprising an amplifier with a second order low pass filter having a cutoff at 75 Hz. Such a filter is useful for making appropriate offsets to the output of the LVDT to result in a normalized sensor output voltage. Before passing into the microprocessor the suspension position sensor output will be further subjected to a differentiation to produce a control signal with a value corresponding to suspension vertical velocity. The differentiator may comprise an analog hardware filter or other type of analog or digital differentiating device known to those skilled in the art to which the present invention pertains.

Once the microprocessor receives a signal corresponding to the position of the road wheel and tire assembly with respect to the body as well as a signal corresponding to the velocity of the road wheel and tire assembly with respect to the vehicle body, the microprocessor is free to begin performing calculations required for implementing various strategies according to the present invention.

The microprocessor may be arranged according to a number of different architectures, but each would generally include an input-output control circuit (I/0) for exchanging data with external devices and a readable, addressable memory (RAM) for temporarily holding data while the data are being processed. Control programs including unit commands will be sequentially read from a read-only memory (ROM). Unit commands will be executed by a central processing unit (CPU).

A system according to this invention will generate a signal which is representative of the vertical velocity of the body by first sensing the relative vertical position of the road wheel and tire assembly 12 by means of LVDT 25. The suspension position signal corresponding to the road wheel and tire position will be integrated within the microprocessor by means of the previously stated digital filter equation which will be loaded into the CPU. As a result of the integration of the position signal, a vertical body velocity signal will be produced. The computer may then use a body velocity signal and suspension velocity signal obtained by differentiating the suspension position signal for producing a control signal with a value based upon a comparison of the two velocity signals— i.e., the body velocity signal and the suspension velocity signal.

FIG. 10 illustrates an example of a first type of algorithm which may be practiced with a suspension position and body velocity sensing system according to the present invention. After starting at block 90, computer transfers to block 92 wherein the output of the suspension position sensor is read. At block 94, the suspension position sensor output is utilized according to the previously described differentiation method for calculating suspension vertical velocity. The suspension position signal is also utilized at block 96 for calculating body vertical velocity according to the previously described digital filtering method. At block 98, the computer compares calculated body velocity and suspension velocity. In the event that each velocity is in the same direction, the computer will, at block 100, set the suspension unit to obtain maximum damping. If, however, the body velocity and suspension velocity are not in the same direction, the computer will, at block 102, set the suspension unit to the minimum damping position. Thereafter, the algorithm returns to block 92 and continues with the same sequence of steps. The algorithm shown in FIG. 10 may be modified so that the suspension unit is placed in a position so as to produce maximum damping only in the event that the magnitude of the body velocity exceeds a threshold value while at the same time the body velocity and suspension velocity are in the same direction. This will help to ensure that the adjustable suspension unit is not needlessly switched to a position of maximum damping when the body vertical velocity is at a small value.

It is possible to implement the algorithm shown in FIG. 10 by means of an adjustable suspension unit having continuously adjustable damping characteristics rather than merely maximum or minimum settings. If this mode of implementation is chosen, the control signal output by the controller to the adjustable suspension unit may be selected such that the magnitude of the damping produced by the suspension unit is proportional to the magnitude of the relative motion of the body with respect to the road wheel. Similarly, the control signal may be selected such that the magnitude of the damping produced by the suspension unit is proportional to the magnitude of the body velocity alone, or alternatively, the signal may be proportional not only to the magnitude of the body velocity but also to the relative motion of the body with respect to the road wheel.

A second control algorithm according to the resent invention is shown in FIG. 11. After reading suspension position and calculating suspension velocity and body velocity as before, the computer at block 112 compares body velocity to an appropriate threshold. If the body velocity exceeds such threshold, the computer, at block 114, asks alternative questions regarding the suspension velocity and the adjustment position of the suspension unit. The first question inquires as to the value of the suspension velocity, vis-a-vis an appropriate threshold value. The second question asks whether the suspension unit was previously adjusted for a high rate of damping during the immediately preceding loop through the algorithm. In the event that either question is answered positively, the computer will adjust the suspension unit at block 116 to a position of high damping. As before, the actual level of damping selected by the computer may be a variable function depending upon the prior velocity of the vehicle or the body or suspension velocities.

Figure 12:
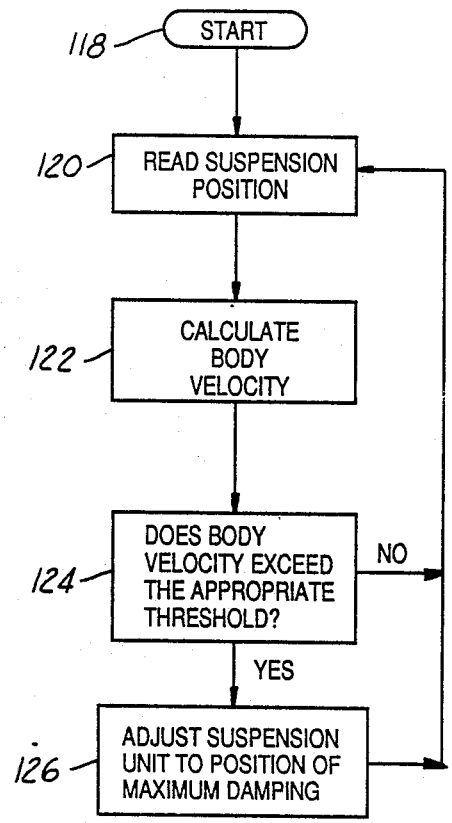

A third algorithm for controlling a suspension by utilizing a system according to the present invention is shown in FIG. 12. After reading the suspension position and calculating body velocity at blocks 120 and 122 respectively, the computer compares the body velocity of block 124 to an appropriate threshold value. In the event that the body velocity exceeds such threshold the suspension will be adjusted to the position of maximum damping. Note that the algorithm at FIG. 12 does not utilize suspension velocity as a control variable. Notwithstanding this difference between the algorithm shown at FIG. 12 and those illustrated in FIGS. 10 and 11, it has been determined that for certain vehicles, an acceptable ride control is achieved without using suspension velocity as an input to the control algorithm.

Figure 8:
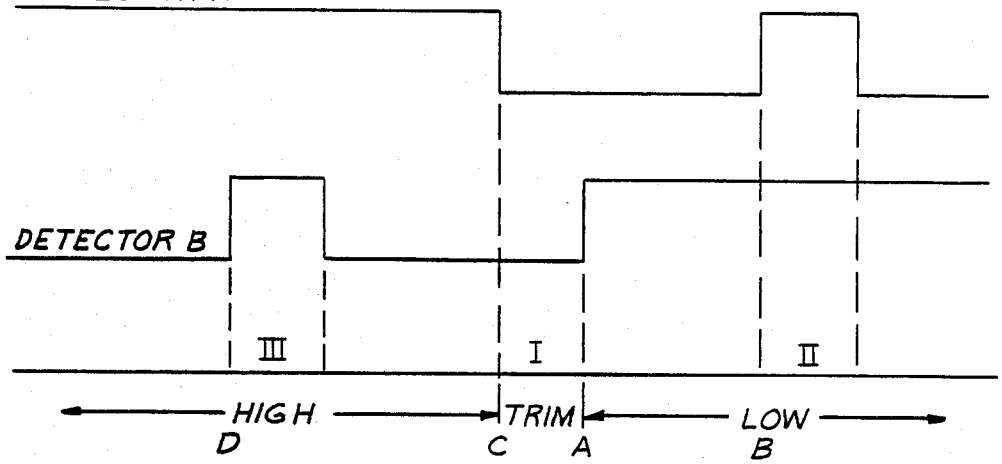
FIG. 8 illustrates an example of an output waveform from a height sensor according to FIG. 7.

As noted above, FIG. 7 illustrates an alternative suspension which may be controlled by a system according to the present invention. As before, an adjustable suspension unit, 14, is employed for producing damping within the suspension system. The suspension shown in FIG. 7 is also capable, however, of controlling the height of the vehicle by means of height adjuster 22 which may, for example, comprise an air or hydropneumatic or other type of known ride height adjusting device. The embodiment of FIG. 7 also includes a rotary height sensor 10 which may be configured using Hall Effect switches. This sensor utilizes link 26 and crank arm 24 for the purpose of converting the up and down motion of suspension control arm 18 into a rotary motion which may be input into the sensor. A typical waveform output for the two detectors included within sensor 10 as shown in FIG. 8. Sensor 10 is described in detail in U.S. patent Application No. 4,822,063, filed on 11-27-87, which is assigned to assignee of the present invention, and which is hereby incorporated by reference herein. In general, the output waveforms in FIG. 8 indicate that the suspension's adjustable ride height can be divided up into a trim region labeled I and low and high regions adjoining the trim region. Each of the low and high regions has a separate marker region, labeled II and III respectively, which may be used by the control module to sense that the vehicle's ride height has moved a certain distance from the trim region in either the high or low direction. For the purpose of providing input to the digital filter described herein, the outputs of detectors A and B shown in FIG. 8 could be assigned values as follows. As an example, the trim region could be assigned a value of 0, whereas the region lying between those regions labeled I and II could be assigned a value of +1. Region II could be assigned a value of +2. Going in the "high" direction of FIG. 8, the region lying between Regions I and III could be assigned a value of −1, whereas Region III could be assigned a value of −2. In this manner the computer may produce an integrated signal representative of a body vertical velocity. Such a signal is shown in FIG. 13.

FIG. 13 is a plot of suspension position, actual body vertical velocity, and calculated body vertical velocity, all as functions of time. Although the product of a simulation, these plots agree with experimental data which show that a digital filtering technique according to the present invention produces a calculated body vertical velocity signal which has generally good agreement with actual body vertical velocity as sensed by an accelerometer. FIG. 13 shows that if the suspension is subjected to a rather sharp input at time A, the body velocity will almost immediately show a marked change. This change results from acceleration of the body as a consequence of the imposition of force by the suspension into the body. As the suspension damper absorbs the spring and inertial forces at work upon the body, the actual body velocity gradually subsides according to a sinusoidal function. A digital filter according to the present invention simulates this sinusoidal decaying velocity by means of an exponential decay as shown in FIG. 13. It is interesting to note that the magnitude of the disagreement between the actual and calculated body velocity signals is not great. The difference, if any, becomes of little consequence in algorithms which rely only upon the absolute value of either suspension velocity or body velocity or both.

Figure 9:
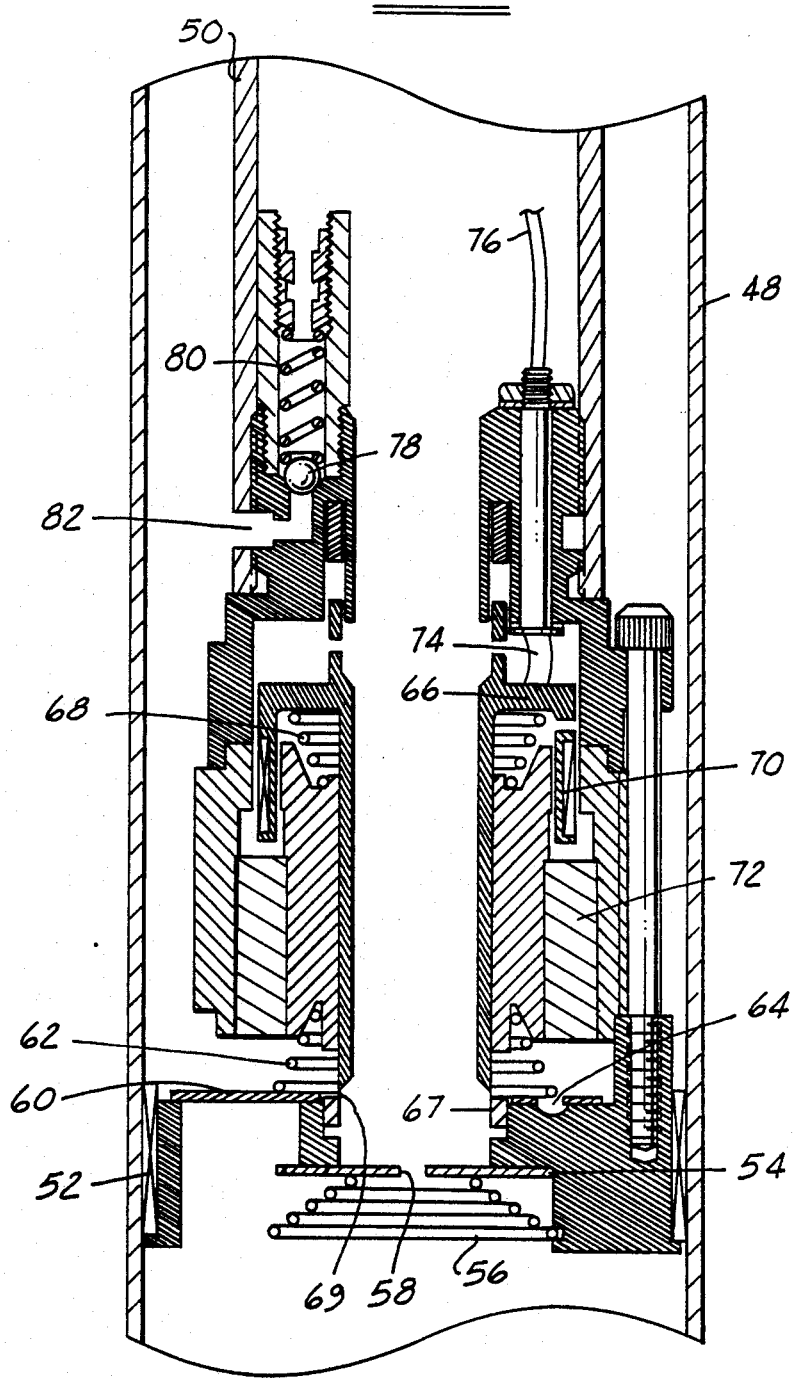
FIG. 9 is a sectional view of a shock absorber piston useful for practicing the present invention.

FIG. 9 illustrates a portion of a shock absorber useful for practicing the algorithms of the present invention which direct adjustable damping unit 14 to either maximum or minimum damping positions. In conventional fashion, a piston assembly slidably housed within pressure cylinder 48 as attached to piston rod 50. The piston rod itself is hollow and provides a reservoir for fluid in conjunction with yet another externally mounted reservoir (not shown). In further conventional fashion, the upper end of the piston rod is attached to the body or chassis of the vehicle whereas the lower end of pressure cylinder 48 is attached to the suspension. This is generally shown in FIGS. 2 and 7. The piston assembly is sealably engaged with the inner wall of pressure cylinder 48 by means of sealing band 52 which is affixed about the outer periphery of the piston at its lowermost extremity. The piston contains a plurality of valve mechanisms. Rebound valve disc 54 is mounted to the lower face of the Piston and maintained in contact with that face by means of rebound valve spring 56. The rebound valve disc has a port 58 which comprises a leakage path for fluid past the rebound disc even when this disc is in the closed position. As its name implies, the function of the rebound disc is to assist in the control of fluid when a shock absorber or strut including the illustrated piston is moving in the rebound direction i.e., in a direction tending to extend the length of the shock absorber. Jounce valve disc 60 is mounted in an intermediate portion of the piston and, as its name implies, assists in the control of fluid flow during jounce movement of the piston i.e., movement in a direction tending to contract the overall length of the shock absorber or strut. The jounce valve is maintained in contact with its seat by means of jounce valve spring 62. This disc has one or more jounce valve ports 64 formed in its midsection so as to permit flow of fluid into an annular recess formed in the jounce valve seating surface.

The shock absorber illustrated in FIG. 9 is capable of producing high and low levels of damping in both jounce and rebound directions because of sleeve valve 66, which comprises a tubular sleeve having a coil 70 wound about a portion thereof with the coil being positioned in proximity to a permanent magnet, 72, in this case a neodymium magnet. The sleeve valve is biased in the open direction i.e., in a direction tending to define an open port, 69, by means of sleeve valve spring 68. When a control signal is applied to coil 70 by means of coil connector 74 and control lead 76, the coil and permanent magnet will combine to produce a force tending to close sleeve valve 66 against sleeve valve seat 67, thereby preventing flow past the sleeve valve. When the sleeve valve is in the closed position, both jounce and rebound flow are prevented from passing through the port defined by the sleeve valve and sleeve valve seat 67. Accordingly, jounce flow passing over jounce valve disc 60 must pass through pop-off channel 82 and past ball valve 78 which is maintained against its seat by means of ball valve spring 80. After passing ball valve 78 the flow passes into the interior of the piston rod and is then sent to an externally mounted reservoir. During closed sleeve valve operation in the rebound condition, fluid trapped above the piston by jounce valve disc 60 will first pass through pop-off channel 82 and then down past rebound disc 54. When the sleeve valve is open, and when the piston is moving in the rebound direction, fluid trapped above the piston will pass through the sleeve valve port defined by the sleeve valve and sleeve valve seat and then over rebound disc 54. Because the fluid pressure in this case will not be allowed to build, no fluid will flow through pop-off channel 82 past ball valve 78. Similarly, during jounce movement when the sleeve valve is in the open position, fluid will flow past jounce valve disc 60 and through the port defined by the sleeve valve and its seat. Again, no fluid will flow through the pop-off channel because fluid pressure will not be allowed to build to any appreciable degree within the shock absorber. Those skilled in the art will appreciate in view of this disclosure that the illustrated shock absorber is merely representative of a class of devices capable of achieving high levels of force output with very low response times. Those skilled in the art should further realize in view of this disclosure that a system according to the present invention could be employed not only with the illustrated parallel arm and MacPherson strut suspensions but with other types such as the Hotchkiss or quadralink designs. A system according to the present invention may be used in connection with active suspension systems as well. These and all other variations which basically rely upon the teachings by which this disclosure has advanced the art are properly considered within the scope of this invention as defined by the appended claims.

I claim:

1. A system for generating a signal which is representative of the vertical velocity of the body of an automotive vehicle, comprising:

position sensor means for sensing the relative vertical position of a road wheel and tire assembly with respect to said body and for producing a suspension position signal corresponding to said road wheel and tire position; and processor means operatively associated with said position sensor means for integrating said suspension position signal so as to produce a body velocity signal which is representative of the vertical velocity of said body, with said processor means further comprising means for employing said body velocity signal for controlling the vertical motion of said body.

2. A system according to claim 1 wherein said position sensor means comprises a linear variable differential transformer.

3. A system according to claim 1 wherein said position sensor means comprises a Hall Effect device.

4. A system according to claim 1 wherein said processor means comprises a digital filter.

5. A system according to claim 4 wherein said digital filter comprises a bandpass filter.

6. A system according to claim 5 wherein said bandpass filter operates about a center frequency of approximately 0.1 to 0.3 Hz.

7. A system for controlling an adjustable suspension unit of a motor vehicle comprising:

position sensor means for sensing the relative vertical position of a road wheel and tire assembly with respect to said body and for producing a suspension position signal corresponding to said road wheel and tire position;

first processor means, for generating a body velocity signal which is representative of the vertical velocity of the body of said automotive vehicle, comprising integrating means for receiving and integrating said suspension position signal;

second processor means, operatively connected with said first processor means, for comparing said body velocity signal with a suspension velocity signal obtained by differentiating said suspension position signal and for producing a control signal with a value which is dependent upon the result of said comparison; and adjustment means operatively connected with said second processor means and responsive to said control signal for adjusting said adjustable suspension unit.

8. A control system according to claim 7 wherein said second processor produces a control signal causing said adjustable suspension unit to be adjusted to a position of maximum damping in the event that said comparison of the body velocity and suspension velocity indicates that the motion of the body and the relative motion of the body with respect to the road wheel are in the same direction.

9. A control system according to claim 8 wherein said control signal is produced only in the event that the magnitude of said body velocity exceeds a threshold value.

10. A control system according to claim 7 wherein said second processor produces a control signal causing said adjustable suspension unit to be adjusted to a position of minimum damping in the event that said comparison of the body velocity and suspension velocity indicates that the motion of the body and the relative motion of the body with respect to the road wheel are in opposite directions.

11. A control system according to claim 7 wherein said second processor produces a control signal causing said adjustable suspension unit to be adjusted to produce damping in the event that said comparison of the body velocity and suspension velocity indicates that the motion of the body and the relative motion of the body with respect to the road wheel are in the same direction, with said control signal being selected such that the magnitude of the damping produced by the suspension unit is proportional to the magnitude of the relative motion of the body with respect to the road wheel.

12. A control system according to claim 7 wherein said second processor produces a control signal causing said adjustable suspension unit to be adjusted to produce damping in the event that said comparison of the body velocity and suspension velocity indicates that the motion of the body and the relative motion of the body with respect to the road wheel are in the same direction, with said control signal being selected such that the magnitude of the damping produced by the suspension unit is proportional to the magnitude of the body velocity.

13. A control system according to claim 7 wherein said second processor produces a control signal causing said adjustable suspension unit to be adjusted to produce damping in the event that said comparison of the body velocity and suspension velocity indicates that the motion of the body and the relative motion of the body with respect to the road wheel are in the same direction, with said control signal being selected such that the magnitude of the damping produced by the suspension unit is proportional not only to the magnitude of the relative motion of the body with respect to the road wheel but also to the magnitude of the body velocity.

14. A control system according to claim 7 wherein said second processor produces a control signal causing said adjustable suspension unit to be adjusted to produce a high magnitude of damping force whenever body velocity exceeds a first threshold value and (i) either the suspension velocity is less than a second threshold value, or (ii) the suspension unit was previously adjusted to produce said high magnitude of damping force.

15. A control system according to claim 7 wherein said second processor produces a control signal causing said adjustable suspension unit to be adjusted to a position of maximum damping in the event that said body velocity exceeds a threshold value.

16. A control system according to claim 15 wherein said threshold value is selected from a plurality of threshold values by said second processor, with such selection being based upon the forward velocity of said vehicle.

17. A system according to claim 7 wherein said position sensor means comprises a linear variable differential transformer.

18. A system according to claim 7 wherein said position sensor means comprises a Hall Effect device.

19. An adjustable suspension unit and suspension control system for a motor vehicle comprising:

position sensor means for sensing the relative vertical position of a road wheel and tire assembly with respect to said body and for producing a suspension position signal corresponding to said road wheel and tire position;

first processor means, for generating a body velocity signal which is representative of the vertical velocity of the body of said automotive vehicle, comprising integrating means for receiving and integrating said suspension position signal;

second processor means, operatively connected with said first processor means, for producing a control signal with a value which is dependent at least upon said body velocity signal; and adjustment means operatively connected with said second processor means and responsive to said control signal for adjusting said adjustable suspension unit so as to control the vertical velocity of said body, with said adjustment means comprising:
a valve housed within a piston attached to a piston rod within said suspension unit and;
electromagnetic means for receiving said control signal and for operating said valve.

20. An adjustable suspension unit and suspension control system according to claim 19 wherein said valve comprises a generally tubular sleeve and said electromagnetic means comprises a coil wound about said sleeve and a permanent magnet positioned in said piston such that an electromagnetic valve control force is produced when said control signal is applied to said coil.

21. An adjustable suspension unit and suspension control system according to claim 19 wherein said position sensor means comprises a linear variable differential transformer.

22. An adjustable suspension unit and suspension control system according to claim 19 wherein said position sensor means comprises a Hall Effect device.

23. An adjustable suspension unit and suspension control system according to claim 19 wherein said second processor means compares said body velocity signal with a suspension velocity signal obtained by differentiating said suspension position signal and produces a control signal with a value which is dependent on the result of said comparison.

* * * * *